S. SAUVAGE.
COOKER.
APPLICATION FILED JULY 5, 1912.

1,087,402.

Patented Feb. 17, 1914.

Witnesses:
Inventor:
Stanley Sauvage
By Brown & Hopkins
Attys

UNITED STATES PATENT OFFICE.

STANLEY SAUVAGE, OF CHICAGO, ILLINOIS.

COOKER.

1,087,402.  Specification of Letters Patent.  Patented Feb. 17, 1914.

Application filed July 5, 1912. Serial No. 707,675.

*To all whom it may concern:*

Be it known that I, STANLEY SAUVAGE, a subject of the King of England, residing at Chicago, in the county of Cook and State of Illinois, have invented certain new and useful Improvements in Cookers, of which the following is a specification.

This invention relates to a cooker adapted to be used in connection with a stove or range employing gas, oil or the like, as a fuel, and the principal object of the invention is to provide a device of the class described which is simple, durable and inexpensive in construction and effective and efficient in operation.

A further object of the invention is to provide a device of the class described in which there is an even distribution of heat which results in an economical use of fuel and an effective and efficient use of heat for cooking materials of different kinds.

For the attainment of these ends and the accomplishment of other new and useful objects, as will appear, the invention consists in the features of novelty in the construction, combination and arrangement of the several parts generally shown in the accompanying drawing and described in the specification, but more particularly pointed out in the appended claims.

Figure 1:
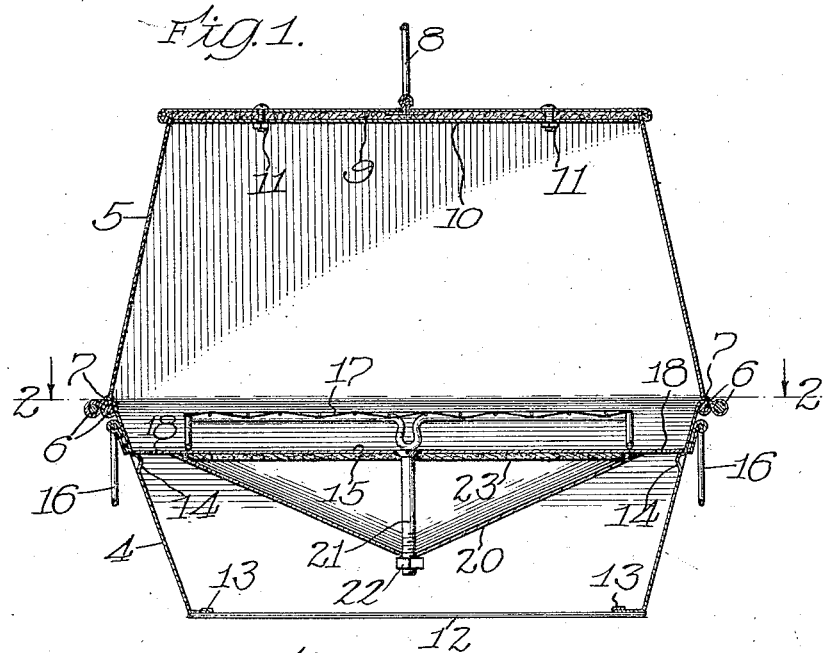
Figure 2:
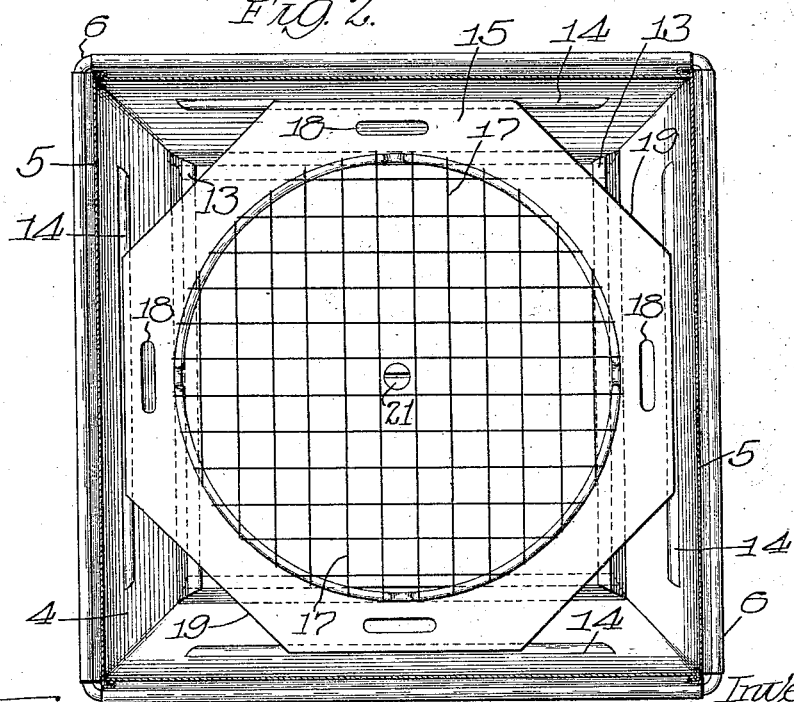

In the drawing Figure 1 is a cross sectional view of a cooker constructed in accordance with the principles of my invention; Fig. 2 is a plan view of the base of the cooker taken on the line 2—2 of Fig. 1.

Various kinds of cookers are employed in connection with gas stoves and the like, which are adapted to be removably positioned over the gas flame to utilize the heat therefrom. These cookers are more or less wasteful of the heat of the flame and usually the flame is so directed that one portion of the cooker becomes heated much more rapidly than the other, resulting in an uneven distribution of the heat and consequently in the uneven cooking of materials disposed therein. The present invention is designed to overcome these difficulties and to present a cooker in which heat is evenly distributed so that materials disposed therein may be evenly cooked.

Referring now more particularly to the drawing and in the present exemplification of the invention, the cooker comprises two separable portions, a bottom member or pan 4 and a top or cover 5. One of these members, preferably the top, is larger than the other so that they may be disposed one within the other to economize space when not in use as a cooker. In their preferred form, as exemplified in the drawing, the members 4 and 5 are rectangular in structure, but, of course, may be of any desired or suitable shape. They are composed of sheet metal or other non-combustible material, preferably diverging toward the edges or rims so that the pans will nest together more readily. The upper edges of the pans or members are preferably rounded over metal strengthening bars 6 in the well-known manner to stiffen the pans and to provide a more rapid construction. The edge or rim of the larger member, in this exemplification the top 5, is provided with a shouldered portion 7 adjacent the edge of the rim so that the rim of the cover 5 will extend beyond the rim of the base member 4 forming a close and substantially closed contact between the pans, and at the same time pressing a bearing surface for the cover upon the base member 4. The top of the lid or cover 5 is provided with a lifter 8 of any desired or suitable construction, preferably in the form of a loop which may be folded against the top of the cover. Disposed within the cover 5 and in contact with the top thereof is a layer or pad of non-conductive material 9. This material is held in position by means of a plate 10 secured to the top of the cover in any suitable manner, as for example, by means of the fastening devices 11. This non-conducting material 9 preferably consists of some such material as asbestos, mineral wool or the like, which is a well-known non-conductor of heat.

The base member 4 is preferably slightly less in depth or height than the top or cover 5 so that in nesting the member 4 within the member 5 it will be entirely disposed within the latter member. The bottom of the member 4 is formed with an opening 12 through which the heat from the flame passes, the edges 13 being folded over and secured together for additional strength. The sides of the member 4 are pressed inwardly to form ridges 14. These ridges 14 are adapted to provide a support for a plate 15 disposed within the pan and preferably adjacent but spaced from the top thereof. The pan is also provided with handles 16 by means of which the pan may be moved and which are foldable against the sides of the pan when it is nested within the cover 5.

The plate 15 disposed within the pan 4 and resting upon the ridges 14 is a support for the materials to be cooked. A wire stand 17 is preferably disposed on top of the plate 15 upon which the articles to be cooked are placed. This stand may be of any desired or suitable construction, the object being to support the material at a slight distance from the plate 15 so that the heat may pass readily beneath the article or material to be cooked and so that the heat will be evenly distributed on all sides thereof. This plate 15 is of such a shape that the heat arising through the opening 12 is allowed to pass upwardly to the space formed by the cover 5. For this purpose the plate 15 may be provided with perforations 18 in the edges of the plate and in the present exemplification of the invention the corners are removed or cut away at 19 so that the heat may pass readily through the opening 12 and upwardly through the pan 4 around the edges of the plate 15. To direct the heat toward the edges of the plate 15, a conical member 20 is disposed beneath the plate 15 with its apex extending downwardly. This conical member 20 is held in position in any suitable manner, such, for example, by means of a bolt 21 with its head engaging the plate 15 and a nut 22 movable on the threaded portion of the bolt to hold the conical member in position. Disposed beneath the plate 15 and held in position by the conical member 20 is a pad or plate of non-conducting material 23, preferably the same material as the pad 9 in the top or cover, which is held in place by the engagement of the conical member with the edges of the pad 23.

In operation the base member 4 is positioned over the flame or burner, from which the heat is to be derived, with the plate 15 resting on the ridges 14 and the conical member 20 disposed below the plate, as shown in Fig. 1. The wire rack is positioned upon the plate and the material to be cooked is placed upon the wire rack. The cover 5 is then placed over the material to be cooked and allowed to remain for any desired or proper time. The heat in entering through the opening 12 in the base member 4 strikes the surface of the conical member 20 and is directed toward the edge of the plate so that the direct impact of the heat does not strike the plate 15 at its center. This prevents the plate 15 from becoming more heated at one point than at another and the air space formed by the conical member 20 together with the pad 23 of non-conducting material causes the surface of the plate adjacent the center to be heated evenly. Diverting the heat toward the sides of the plate 15 causes it to be projected through the openings at the sides of the plate and around the plate at its cut-away portions, so that the heat is evenly distributed in the space formed by the cover. Since the material to be cooked is spaced from the plate 15 by means of the wire stand 17, access may be had upon all sides of the article or material to be cooked, as well as on the top and bottom thereof, which results in the heat being evenly applied and evenly distributed, the plate at the top of the cover being separated from the outside of the cover by means of the pad of non-conducting material 9 which prevents the top of the cover from becoming unduly heated, directs the heat which arises from the openings 18 and from around the plate 15 downwardly after striking the plate 10 and retains the heat given to the plate 10 within the cover so that the heat does not escape so readily, resulting thereby in an economical and efficient use of the heat.

While I have thus described the preferred embodiment of my invention, it is evident that those skilled in the art to which this appertains may make various changes in the construction, combination and arrangement of the several parts without departing from the spirit and scope of my invention.

What I claim is:

1. An apparatus of the class described embodying opposed hollow elements, constituting respectively a base and a cover section, the base section having an opening in the bottom thereof, a plate disposed within the base section and extending across the said opening, supporting means disposed intermediate the top and bottom of the base section for removably holding the plate in position, and a deflector supported by and depending below the plate, there being passages by means of which heated air will pass from beneath the plate to the other side thereof, said cover section being of a size that when inverted, the base section, and plate and deflector may be nested therein.

2. An apparatus of the class described embodying opposed hollow elements constituting respectively a base and a cover section, the base section having an opening in the bottom thereof, a plate disposed within the base section and extending across the said opening, supporting means carried by the base section and disposed intermediate the top and bottom of the section for removably holding the plate in position, a deflector supported by and depending below the plate, there being passages by means of which heated air will pass from beneath the plate to the other side thereof, and heat insulating means disposed between the plate and deflector.

3. An apparatus of the class described embodying opposed hollow elements constituting respectively a base and a cover section, the base section having an opening in the bottom thereof, a plate disposed within the base section and extending across the said opening, supports carried by the base section intermediate the top and bottom of the section for removably holding the plate in position, and a deflector supported by and depending below the plate and above the opening in the base section, portions of the plate being cut away to form passages for heated air from beneath to the top of the plate.

4. An apparatus of the class described embodying opposed hollow elements constituting respectively a base and a cover section, the base section having an opening in the bottom thereof, a plate disposed within the base section and extending across the said opening, supports carried by the base section intermediate the top and bottom of the section for removably holding the plate in position, a hollow deflector depending below the plate with the open side adjacent the plate, and a pad of material non-conductive of heat disposed between the plate and the adjacent edge of the deflector, and means securing the plate, pad and deflector together, portions of the plate being cut away to form passages for heated air from one side of the plate to the other side thereof.

5. An apparatus of the class described embodying opposed hollow elements constituting respectively a base and a cover section, the base section having an opening in the bottom thereof, a plate disposed within the base section and extending across the said opening, supports carried by the base section intermediate the top and bottom of the section for removably holding the plate in position, a deflector supported by and depending below the plate and above the opening in the base section, portions of the plate being cut away to form passages for heated air from beneath to the top of the plate, and heat insulating means for the top of the cover section.

6. In a device of the class described, the combination with a rectangular base pan having an opening in the bottom thereof and lateral supports, of a plate disposed upon the supports having apertures in the edges and with the corners of the plate cut off, a pad of material non-conductive of heat disposed below the plate, a conical diverting member with its apex extending downwardly and the edges of the conical diverting member extending within the inner edges of the perforations and of a size to engage the edges of the pad, and fastening means for securing the conical member to the plate.

7. In a cooker of the class described, the combination with a base member having an opening in the bottom and laterally projecting ridges adjacent the upper edge of the sides to form a support, of a cover therefor having grooves formed adjacent the rim to constitute a supporting surface for the cover, a heating and deflecting plate disposed in the cover, a pad of material non-conductive of heat disposed between the plate and the top of the cover, means to secure the said plate and pad in connection with the cover, a plate perforated at the edges and with the corners cut away, disposed upon the supports in the said base member, a deflector disposed beneath the plate for diverting heat toward the edges of the plate, a pad of material non-conductive of heat disposed beneath the plate, means to secure the deflecting member to the plate and to hold the said pad in position, and an article support disposed upon the plate for supporting material to be cooked.

In testimony whereof I have signed my name to this specification, in the presence of two subscribing witnesses, on this 1st day of July, A. D. 1912.

STANLEY SAUVAGE.

Witnesses:
KENT W. WONNELL,
CHARLES H. SEEM.

---

Copies of this patent may be obtained for five cents each, by addressing the "Commissioner of Patents, Washington, D. C."